No. 851,604. PATENTED APR. 23, 1907.
C. H. McCARTY & F. A. WOOSTER.
FOLDING DRAWING KNIFE HANDLE.
APPLICATION FILED JAN. 7, 1907.
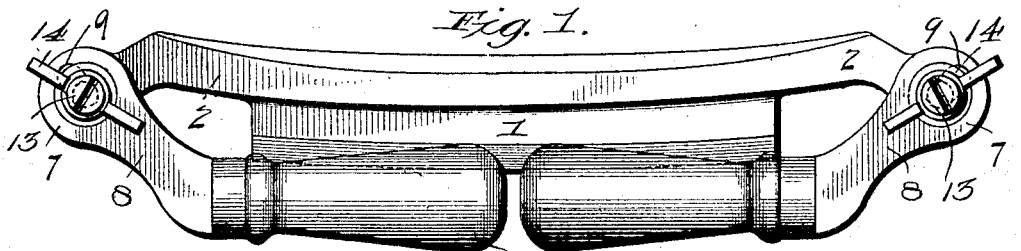
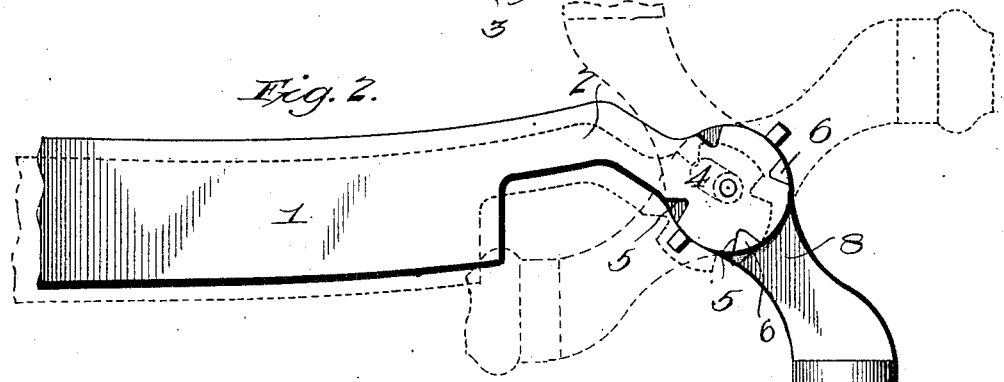
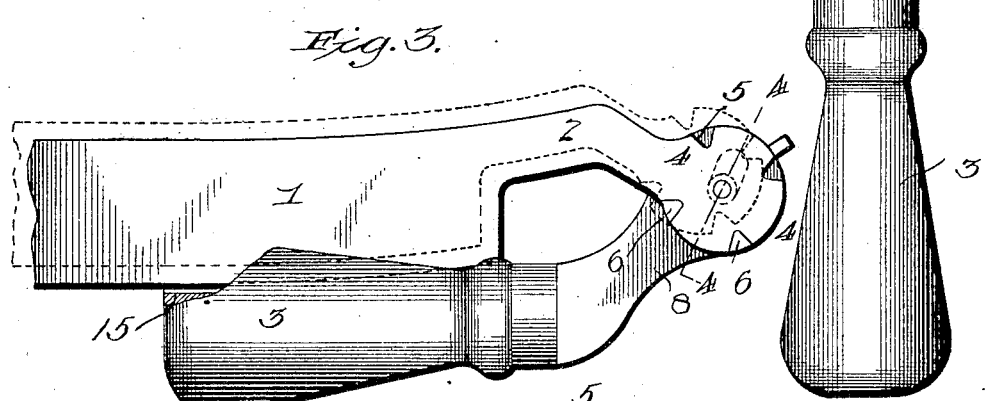
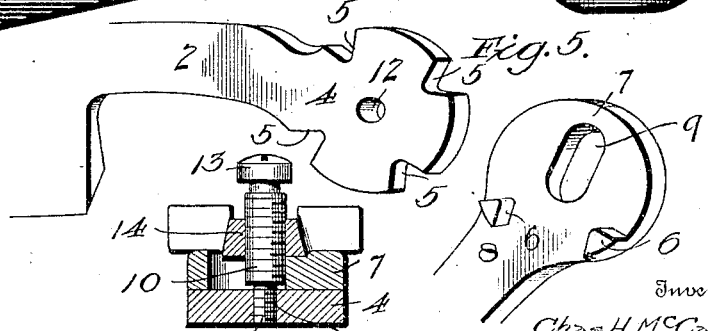
Inventors
Chas. H. McCarty &
Fred A. Wooster

UNITED STATES PATENT OFFICE.

CHARLES H. McCARTY AND FREDERICK A. WOOSTER, OF YOUNGSTOWN, OHIO, ASSIGNORS TO THE RELIANCE EDGE TOOL COMPANY, OF YOUNGSTOWN, OHIO, A CORPORATION OF OHIO.

FOLDING DRAWING-KNIFE HANDLE.

No. 851,604.          Specification of Letters Patent.          Patented April 23, 1907.

Application filed January 7, 1907. Serial No. 351,193.

*To all whom it may concern:*

Be it known that we, CHARLES H. McCARTY and FREDERICK A. WOOSTER, citizens of the United States, residing at Youngstown, in the county of Mahoning and State of Ohio, have invented certain new and useful Improvements in Folding Drawing-Knife Handles, of which the following is a specification.

This invention relates to the subject of woodworking tools, and has special reference to certain new and practical improvements in that type of tools known as drawing knives.

To this end, the invention primarily has in view the equipment of a drawing knife blade with folding handles capable of adjustment to a plurality of positions. In this connection the invention contemplates a construction wherein the handles of the knife are capable of being folded inwardly to a position entirely out of the way directly over the cutting edge of the knife blade thereby permitting the knife to be handled with perfect safety when not in use, and also placed in a small compass in the tool kit or chest without danger of injuring the cutting edge. Also the construction claimed admits of the handles being set in the customary positions at substantially right angles to the line of the blade, and furthermore in positions substantially in a line with the blade, thereby giving the workman a wide range of adjustment and making it possible to set the handles in positions best suited for special kinds of work.

Another object of the invention is to provide a folding handle equipment for drawing knife blades which embodies in its construction secure and rigid locking means for locking and bracing the handles in each of their several set positions. A special object in this relation is to provide locking means for the handles which effect a triangular or three-cornered bracing principle thus giving great strength and rigidity and making it impossible for the handles to slip in relation to the knife while in the hands of the mechanic.

A further object is to provide simple and convenient means for facilitating the locking and unlocking of the handles.

With these and other objects in view which will readily appear to those familiar with the art, as the nature of the invention is better understood, the same consists in the novel construction, combination and arrangement of parts hereinafter more fully described, illustrated and claimed.

In the accompanying drawings, Figure 1, is a side elevation of a drawing knife having folding handles, and embodying the present invention; the handles being shown folded inwardly over the blade. Fig. 2 is an enlarged detail elevation of one handle attachment showing the handle set and locked in the customary working position, and showing in dotted lines the other three possible positions thereof. Fig. 3 is a similar view showing the handle locked in its inwardly folded position. Fig. 4 is a detail cross sectional view through the pivot joint on the line 4—4 of Fig. 3. Fig. 5 is a detail perspective view showing in separated relation the co-acting members of the combined pivot and locking joint for each handle.

Like references designate corresponding parts in the several figures of the drawings.

In carrying out the invention, no change is involved in the conventional form and use of the drawing knife blade, so for illustrative purposes, there is shown in the drawings a knife blade 1 of the usual design and provided at its opposite ends with the projecting end blade shanks 2 which provide the supporting and carrying members for the opposite handles or hand grips 3.

The present invention contemplates connecting the handles 3 with the blade shanks 2 in such a manner as to permit of a folding adjustment of the handles into any of four positions, and rigidly locking the same in such positions with facility and despatch. To secure these results, each of the end blade shanks 2 is provided at its extremity with a knuckle ear 4 preferably of a circular or disk form and having in its edge a plurality of keeper notches 5. These notches are arranged at uniform distances apart, so that the same may be utilized in pairs, or paired relation, and are preferably of a V-shape to receive therein a pair of correspondingly shaped rigid lock-studs 6 projected laterally from one side of a pivot head 7 formed at the extremity of the handle shank 8 carrying the handle 3. The pivot head 7 at one end of each handle shank 8 is also preferably of a circular or disk form so as to match the corresponding knuckle ear 4 of the blade shank and complete therewith a combined pivot and locking joint for the holding adjustment and fastening of the handle.

The lock-studs 6 are preferably integral with the head 7 from which they project and are spaced apart the same distance as the spacing between the series of notches 5 in the knuckle ear 4, so that in each of the four possible positions of the handle, the said studs register in a pair of the notches thus securing a rigid holding and bracing at two points. In connection with said lock-studs, each pivot head 7 is provided therein with a combined bearing and clearance slot 9. This slot is in the form of an oblong hole extending from the axial center of the head 7 toward the edge opposite the lock-stud 6 and disposed transversely of the head in a plane lying between the stud.

The slot 9 loosely receives therein the pivot screw 10 having a fast connection at one end as at 11, in the center hole 12 of the knuckle ear 4 and provided, at what may be termed its outer end, with a stop head 13 for confining and limiting the movement of a winged binding nut 14 adapted to impinge against the side of the head 7 opposite the stud 6 thereof.

From the construction described, it will be obvious that in order to swing the handle on its pivot, it is simply necessary to slightly loosen the nut 14 so as to permit the head 7 to be shifted or slid laterally in a direction for carrying the studs 6 out of and clear from the notches 5, the slot 9 permitting this action. When this is done, the handle and handle shank can be swung around to any of the four possible positions and then slid inward on the knuckle ear 4 to carry the studs 6 back into a pair of the notches 5, after which the nut 14 is tightened and the handle thereby rigidly locked against any movement whatever.

When in any of its locked positions, it will be observed that the inner end of the slot 9 takes a bearing over the screw or post 10 thereby adding a third holding and bracing point. This, in connection with the studs 6, provides the triangular or three cornered bracing effect herein referred to.

A groove 15 in each of the handles permits them to be folded directly over the edge of the blade.

We claim—

1. In a handle attachment for drawing knives, the blade shank having a knuckle ear provided in its edge with a plurality of angular keeper notches, a folding handle shank provided upon one face thereof with a pair of offset angular lock-studs for engagement with said notches, said handle shank being further provided with a transverse slot lying in a plane between the studs, a pivot extending through said slot and permitting the handle shank to have a limited sliding movement on the knuckle ear, and a binding nut arranged to hold the parts interlocked.

2. In a handle attachment for drawing knives, the blade shank having a knuckle ear provided in its edge with a plurality of keeper notches, a folding handle shank provided upon one face thereof with a pair of offset lock-studs for engagement with said notches, said handle shank being further provided with a transverse slot lying in a plane between the studs, a pivot extending through said slot and permitting the handle shank to have a limited sliding movement on the knuckle ear, and locking means.

In testimony whereof we hereunto affix our signatures in the presence of two witnesses.

CHARLES H. McCARTY.
FRED. A. WOOSTER.

Witnesses:
 ROY CLARK,
 KARL K. GRANGER.